(12) United States Patent  
Cardno et al.

(10) Patent No.: US 9,811,929 B2
(45) Date of Patent: *Nov. 7, 2017

(54) DATA VISUALIZATION METHODS

(71) Applicant: New Bis Safe Luxco S.à r.l., Luxembourg (LU)

(72) Inventors: Andrew John Cardno, San Diego, CA (US); Peter Stewart Ingham, Avalon (NZ); Bart Andrew Lewin, Woodland Hills, CA (US); Ashok Kumar Singh, Henderson, NV (US)

(73) Assignee: New BIS Safe Luxco S.à r.l, Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 15/277,987

(22) Filed: Sep. 27, 2016

(65) Prior Publication Data
US 2017/0018103 A1    Jan. 19, 2017

Related U.S. Application Data

(63) Continuation of application No. 14/200,903, filed on Mar. 7, 2014, now Pat. No. 9,454,833, which is a
(Continued)

(51) Int. Cl.
G06T 11/20 (2006.01)
G06T 11/00 (2006.01)
(Continued)

(52) U.S. Cl.
CPC ......... *G06T 11/206* (2013.01); *G06T 11/001* (2013.01); *G07F 17/32* (2013.01);
(Continued)

(58) Field of Classification Search
None
See application file for complete search history.

(56) References Cited

U.S. PATENT DOCUMENTS 7,280,105 B2   10/2007   Cowperthwaite
7,562,039 B2    7/2009   Evertsz et al.
(Continued)

FOREIGN PATENT DOCUMENTS

WO    WO 2009/154483 A1    12/2009

OTHER PUBLICATIONS

Cardno, Adrew John, Office Action, U.S. Appl. No. 14/200,637, Jan. 29, 2016, 18 pgs.
(Continued)

*Primary Examiner* — Yi Wang
(74) *Attorney, Agent, or Firm* — Merchant & Gould P.C.

(57) ABSTRACT

A method for creating a graphical representation of data is performed at an electronic device having one or more processors and memory. The device receives a finite set of data points and calculates a respective conical distribution for each respective data point centered on the respective data point and based on a respective data value. Each conical distribution comprises a set of locations and a unique distribution value corresponding to each location. The device determines that a first data value of a first data point is less than a distribution value for a second data point. The distribution value has a location that corresponds to the first data point. Based on that determination, the device calculates an inverse conical distribution in a region around the first data point. The device combines the conical distributions and inverse conical distributions to display a data visualization that includes each of the data points.

17 Claims, 10 Drawing Sheets

Related U.S. Application Data continuation of application No. 12/866,842, filed as application No. PCT/NZ2009/000246 on Nov. 13, 2009, now Pat. No. 8,669,994.

(60) Provisional application No. 61/115,037, filed on Nov. 15, 2008.

(51) Int. Cl.
  *G07F 17/32* (2006.01)
  *G07F 19/00* (2006.01)

(52) U.S. Cl.
  CPC ...... *G07F 17/3232* (2013.01); *G07F 17/3255* (2013.01); *G07F 19/20* (2013.01)

(56) References Cited

U.S. PATENT DOCUMENTS

| | | |
|---|---|---|
| 7,734,607 B2 | 6/2010 | Grinstein et al. |
| 7,967,451 B2 | 6/2011 | Chen et al. |
| 2002/0174049 A1 | 11/2002 | Kitahara |
| 2004/0148247 A1 | 7/2004 | Miller et al. |
| 2005/0066277 A1 | 3/2005 | Leah et al. |
| 2006/0036425 A1 | 2/2006 | Le Cocq et al. |
| 2007/0198203 A1 | 8/2007 | Kimura |
| 2008/0091757 A1 | 4/2008 | Ingrassia et al. |

OTHER PUBLICATIONS

Cardno, Adrew John, Notice of Allowance, U.S. Appl. No. 14/200,637, May 26, 2016, 8 pgs.

Cardno, Adrew John, Notice of Allowance, U.S. Appl. No. 14/200,903, May 27, 2016, 9 pgs.

Joseph K. Berry, "Nearby Things are More Alike," Geo World, Feb. 2006, 2 pgs.

Joseph K. Berry, "Spatially Aggregated Reporting: The probability is Good," GeoWorld, Jan. 2006, 2 pgs.

Eser Kandogan, "Visualizing Multi-Dimensional Clusters, Trends, and Outliers Using Star Coordinates," In Proceeding of the seventh ACM SIGKDD International Conference of Knowledge Discover and Data Mining, pp. 107-116, ACM, 2001.

DATA VISUALIZATION METHODS

RELATED APPLICATIONS

This application is a continuation of U.S. patent application Ser. No. 14/200,903, filed Mar. 7, 2014, issued as U.S. 9,454,833 on Sep. 27, 2016, entitled "Improved Data Visualization Methods," which is a continuation of U.S. patent application Ser. No. 12/866,842, filed Mar. 3, 2011, issued as 8,669,994 on Mar. 11, 2014, entitled "Improved Data Visualization Methods," which is a National Stage Entry of PCT/NZ09/00246, filed Nov. 13, 2009, entitled "Improved Data Visualization Methods," which claims priority to U.S. Provisional Patent Application 61/115,037, filed Nov. 15, 2008, entitled "Improved Data Visualization Methods," each of which is hereby incorporated by reference in its entirety.

This application is related to U.S. patent application Ser. No. 14/200,637, filed Mar. 7, 2014, entitled "Data Visualization Methods," which is incorporated by reference in its entirety.

TECHNICAL FIELD

The present invention relates to improved data visualization methods. In particular, some embodiments relate to various methods of creating graphical representations of data in the form of heatmaps.

BACKGROUND

A chart or graph is described in Wikipedia as a type of information graphic or graphic organizer that represents tabular numeric data and/or functions. Charts are often used in an attempt to make it easier to understand large quantities of data and the relationship between different parts of the data. Charts can usually be read more quickly than the raw data that they come from. They are used in a wide variety of fields, and can be created by hand (e.g., on graph paper) or by computers using various charting applications.

Traditional charts use well established and often poorly implemented ways of representing data. Many tools exist to help the user construct very sophisticated representations of data but that sophistication typically results in less meaningful charts.

It is known to use charting wizards such as those that are available in Microsoft® Excel™ and various other systems such as those provided by, for example, IBM.® In addition there are multiple Business Intelligence (BI) tools available to users to enable users to analyze data in an attempt to create meaningful feedback. However, as the amount of data increases, so does the complexity of the visual representations created by the analysis of the data. These complex representations can end up swamping parts of the visual representation that are most useful and relevant to an end user.

One known method of visualizing data is a heatmap. A heatmap identifies the data values of individual data points by allocating a specific color based on the data value. For example, red may indicate that the data value is high, and blue may indicate that the data value is low. The color spectrum in between red and blue may then be used to indicate the intermediate values for relevant data points. The heatmap graphic is particularly useful for showing the position and intensity of certain data values with respect to other data values and within a defined environment, such as a geographical area or temporal period.

It is known to create heatmaps using an inverse distance weighted (IDW) formula, such as a bell shaped curve. However, these methods are extremely complex and can cause artifacts, which can be particularly problematic. It is also known to use a cubic spline method to create a heatmap, but this method is particularly processor (CPU) intensive.

Heatmaps produced by the above described methods, such as that shown in FIG. 1, can produce quite garish and intense maps that tend to confuse the eye of the reader. For example, the heatmap of FIG. 1 is produced by rendering circles around a specific data point, where the color and diameter of the circle is based on a variable associated with the data point. Smaller diameter circles are used to represent smaller data values and larger diameter circles are used to represent larger data values. Further, the larger the circle (or data value) the "hotter" the color used to represent the circle. For example, the largest values may be rendered using large circles colored red, whereas the smallest values may be rendered using small circles colored blue. At points where the circles overlap, the circle associated with the largest data value has priority over the smaller circles and the color for the larger circle is shown in the overlap region.

One problem associated with this method of rendering the overlapped region is that only the values of data points representing the largest values appear in the overlap regions and an accurate representation of the overlap regions is not provided. For example, two data points that are close to each other that represent a maximum value will be rendered using the same color as three or four (or more) data points that are close to each other that represent the same maximum value. A further problem occurs when data points representing smaller values are positioned next to or close to data points representing larger values as the rendered larger value data points obscure the rendered smaller value data points. This results in loss of information being conveyed to the user because minimal data values may be a very important part of the data analysis.

Prior known methods typically use spread functions, such as bell shaped curves, to calculate interpolation values for each point on a heatmap. These spread functions tail off over a long distance (graphically), requiring each point to take into account all other data points, even if positioned a large graphical distance away from the data point being calculated. Therefore, high levels of computing are required to calculate all values on the heatmap as all points influence all other points.

SUMMARY

Disclosed embodiments overcome or reduce the problems associated with the known methods. In particular, disclosed embodiments provide systems and methods that enable efficient production of heatmaps and other graphical displays without loss of valuable data.

According to some embodiments, a method for creating a graphical representation of data in the form of a heatmap is performed at an electronic computing device. The device positions data points on a heatmap for graphical representation and calculates conical distribution values around a first data point based on a first data value associated with the first data point. When a conical distribution value around the first data point is greater than a second data value associated with a second data point, the device adjusts the conical distribution values proximate to the second data point by applying an inverse conical distribution around the second data point. The device renders the heatmap based on the calculated conical distribution values and the adjusted conical distribution values so that the data value of the second data point is visible on the heatmap.

In some embodiments, the conical distribution values are calculated by applying a frustoconical distribution, an exact conical distribution, or a skewed conical distribution.

In some embodiments, the inverse conical distribution values are calculated by applying one of an inverse frustoconical distribution, an exact inverse conical distribution, or a skewed inverse conical distribution.

In some embodiments, the device sums conical distribution values when conical distributions for multiple data points overlap.

In some embodiments, the device selects a highest conical distribution value of multiple data points when conical distribution values for the multiple data points overlap.

In some embodiments, the device adjusts conical distribution values at edges of a distribution to provide a smoothing effect.

In some embodiments, the data is gaming data associated with a gaming environment or retail data associated with a retail environment.

According to some embodiments, a graphical computing system for generating a heatmap includes one or more processors, memory, and one or more programs stored in the memory for execution by the one or more processors. The one or more programs include a data calculation module configured to position data points on a heatmap for graphical representation and calculate conical distribution values around each respective data point based on a respective data value associated with the respective data point. The one or more programs include a minima detection module configured to determine when a conical distribution value for a first data point is greater than a second data value associated with a second data point distinct from the first data point. The one or more programs include an inverse conical calculation module configured to calculate inverse conical distribution values around each respective detected minima data point, the inverse conical distribution values based on the respective data value of the respective detected minima data point. The one or more programs also include a rendering module configured to render the heatmap based on the calculated conical distribution values and the calculated inverse conical distribution values such that each data value associated with a detected minima data point is visible in the heatmap.

One of skill in the art also knows that a graphical representation of data may use features other than color to represent different data values. For example, values may be represented by different shades of gray (e.g., small values represented by nearly white, very large values represented by black, and intermediate values represented by intermediate shades of gray) or shading patterns. Although the example embodiments are implemented in colored heatmaps, the disclosure is not limited to the use of colored heatmaps.

According to some embodiments, a method for creating a graphical representation of data is performed at an electronic device having one or more processors and memory. The device receives a finite set of data points and calculates a respective conical distribution for each respective data point centered on the respective data point and based on a respective data value. Each conical distribution comprises a set of locations and a unique distribution value corresponding to each location. The device determines that a first data value of a first data point is less than a distribution value for a second data point, where the distribution value has a location that corresponds to the first data point. Based on the determination, the device calculates an inverse conical distribution in a region around the first data point and combines the conical distributions and inverse conical distributions to display a data visualization that includes each of the data points.

In some embodiments, the data visualization is displayed as a heatmap in which colors are assigned to locations based on the distribution values corresponding to each location.

In some embodiments, the conical distribution is a frustoconical distribution, an exact conical distribution, or a skewed conical distribution.

In some embodiments, the inverse conical distribution is an inverse frustoconical distribution, an exact inverse conical distribution, or a skewed inverse conical distribution.

In some embodiments, the device sums distribution values at locations where conical distributions for multiple data points overlap.

In some embodiments, the device selects a highest distribution value of multiple data points at locations where conical distributions for the multiple data points overlap.

BRIEF DESCRIPTION OF THE DRAWINGS

Embodiments of the present invention will now be described, by way of example only, with reference to the accompanying drawings.

Like reference numerals refer to corresponding parts throughout the drawings.

DESCRIPTION OF IMPLEMENTATIONS

Figure 1:
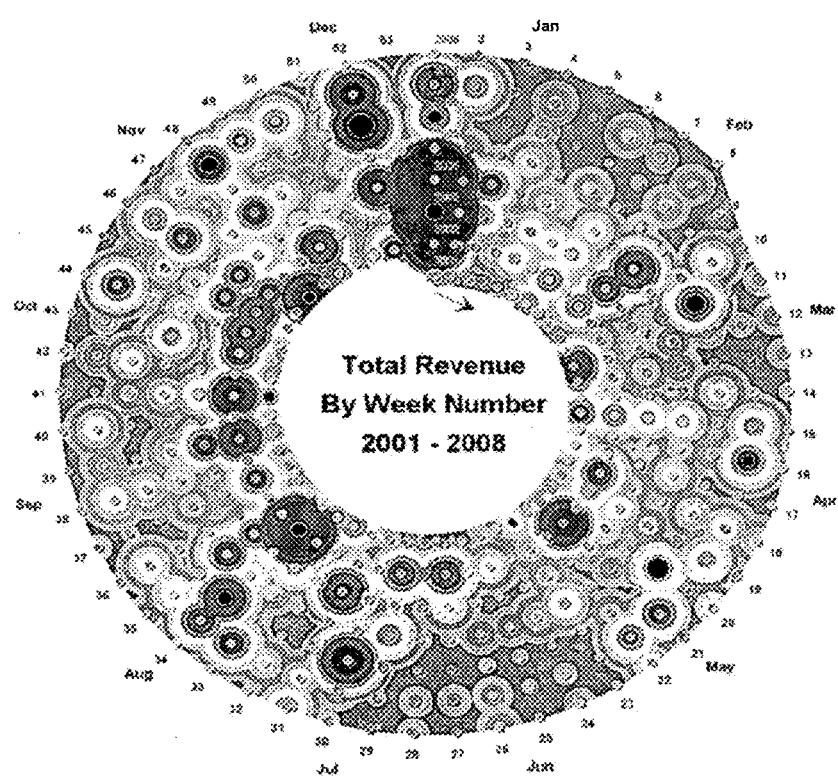
FIG. 1 shows an example of a heatmap using a prior known method.

The disclosed systems and methods are suitable for use in conjunction with other methods, and the incorporation into one or more systems, such as those described in U.S. Provisional Patent Application No. 61/074,347, filed Jun. 20, 2008, entitled "Methods, Apparatus, and Systems for Data Visualisation and Related Applications," which is hereby incorporated by reference in its entirety.

Some embodiments are described herein with reference to a system adapted or arranged to perform various methods of creating graphical heatmap representations.

In some embodiments, a system includes at least a processor, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the system may include one or more communication devices (wired or wireless) for communicating with external and internal devices, and one or more input/output devices, such as a display, pointing device, keyboard or printing device.

The processor is arranged to perform the steps of a program stored as program instructions within the memory device. The program instructions perform the various methods described herein. The program instructions may be developed or implemented using any suitable software programming language or toolkit, such as, for example, a C-based language. Further, the program instructions may be stored in any suitable manner such that they can be transferred to the memory device or read by the processor, such as, for example, being stored on a non-transitory computer readable medium. The computer readable medium may be any suitable medium, such as, for example, solid state memory, magnetic tape, a compact disc (CD-ROM or CD-R/W), memory card, flash memory, optical disc, magnetic disc or any other suitable non-transitory computer readable medium.

In some embodiments, the system is arranged to be in communication with external data storage systems or devices in order to retrieve the relevant data.

It will be understood that exemplary systems described herein include one or more elements that are arranged to perform the various functions and methods as described herein. The following portion of the description provides the reader with an example of a conceptual view of how various modules and/or engines that make up the elements of the system may be interconnected to enable the functions to be implemented. Further, the following portion of the description explains in system related detail how the steps of the herein described method may be performed. The conceptual diagrams are provided to indicate to the reader how the various data elements are processed at different stages by the various different modules and/or engines.

It will be understood that the arrangement and construction of the modules or engines may be adapted accordingly depending on system and user requirements so that various functions may be performed by different modules or engines to those described herein.

It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using any suitable mixture of hardware, firmware, or software, including software that is interpreted at runtime. For example, portions of the modules may be implemented using an application specific integrated circuit (ASIC), a system-on-a-chip (SoC), field programmable gate arrays (FPGA) or any other suitable adaptable or programmable processing device.

The methods described herein may be implemented using a general purpose computing system specifically programmed to perform the described steps. Alternatively, the methods described herein may be implemented using a specific computer system such as a data visualization computer, a database query computer, a graphical analysis computer, a gaming data analysis computer, a retail environment analysis computer, a manufacturing data analysis computer, a business intelligence computer, and so on, where the computer has been specifically adapted to perform the described steps on specific data captured from an environment associated with a particular field.

For example, the methods described herein may be applied or implemented using a gaming data analysis computer. A gaming environment is monitored and data associated with the gaming environment is stored in a data storage module. The data is then represented using a heatmap as described herein. The gaming data used to develop the heatmap may be related, for example, to the operations of a casino. This may include data associated with the performance of various gaming machines and devices, as well as data associated with ATMs, cashiers, gaming tables, slot machines, electronic gaming machines, kiosks, related hotel devices etc.

As another example, the methods described herein may be applied or implemented using a retail environment analysis computer. A retail environment is monitored and data associated with the retail environment is stored in a data storage module. The data is then represented using a heatmap as described herein. The retail data used to develop the heatmap may be related, for example, to purchasing information associated with consumers, products sold in the retail environment, profit margins, purchasing costs, manufacturing costs, sale prices, consumer prices, the location of the retail environment and related premises, distribution data etc.

Figure 2A:
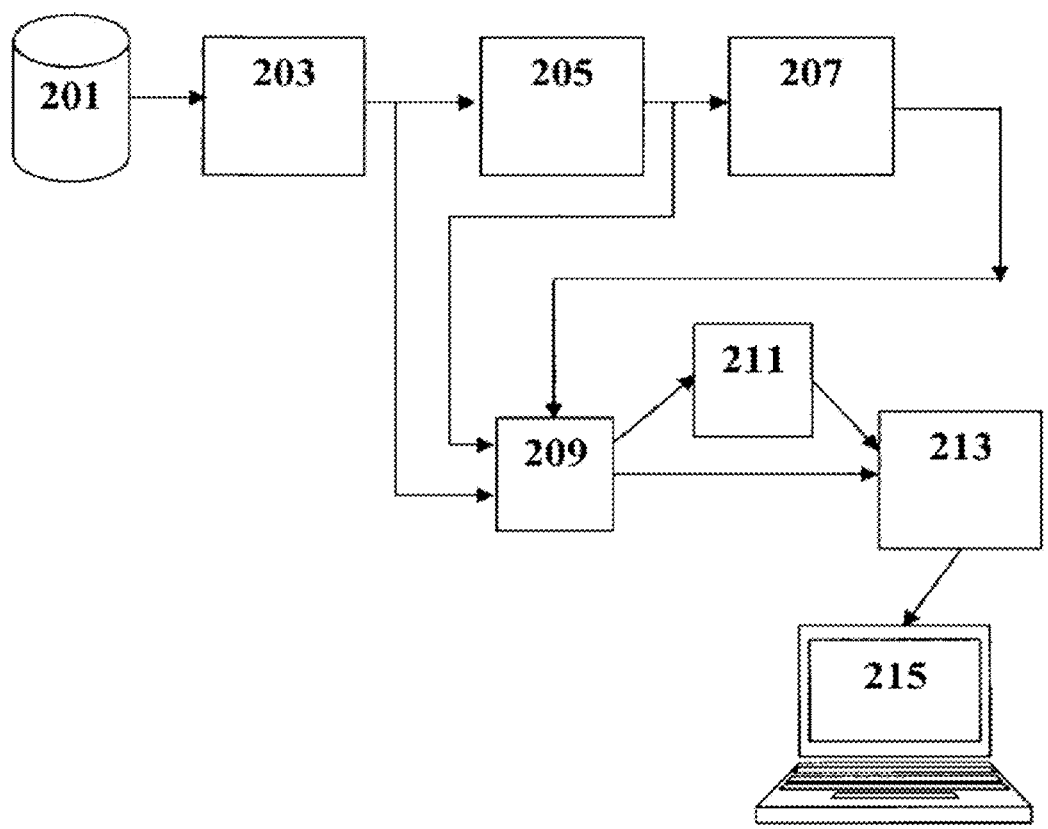
FIG. 2A shows a system block diagram of a data visualization system according to some embodiments.

FIG. 2A shows a system block diagram of a data visualization system specifically adapted to perform the various methods described herein.

A data storage module 201 provides data to a data retrieval module 203 upon request from the data retrieval module. That is, the data retrieval module 203 is configured to enable the retrieval of data from a data storage module 201, which is in communication with the data visualization system. The data storage module 201 may be any suitable type of data storage system. For example, it may be an enterprise data warehouse (EDW), a data mart, a database, a storage array or any other suitable device or groups of devices that can store data for later retrieval. Further, the data storage module 201 may be a cache memory used to temporarily store incoming data captured in real time.

A data point calculation module 205 receives or accesses the data from the data retrieval module 203 in order to calculate distribution values on and around each of the data points, as will be described in more detail below. In summary, the data point calculation module applies a geometric spatial distribution in the form of a substantially conic distribution about the data point based on the data value. In some embodiments an exact conical distribution method is used. However, it will be understood that the terms "cone," "conic," and "conical distribution" include other conic type distribution forms that may be applied other than an exact conic form in order to produce the advantages of the present invention. Indeed, the shape of the distribution around a data point may be tailored to the type of data being analyzed. Certain forms of data may be more suited to certain types of conic distribution in order to more accurately convey the data's properties.

Due to the use of the data point calculation module as described herein, an interpolation module is not required in order to calculate points in between known data points. Interpolation between data points is not required as the distribution calculations around a data point perform this task. This therefore provides a more efficient data visualization generation system.

A minima check module 207 performs a check on each of the distribution values for each of the data points to see whether a distribution value generated for the data point is greater than the actual data value of a nearby data point. This may occur when two data points are close to each other such that a first data point representing a large value swamps a second data point representing a smaller value. That is, if a heatmap or other data visualization were rendered, the minima value being represented by the second data point would not be shown after the data point calculation module has made the required calculations because the cone generated by the data point calculation module for the first data point engulfs the minima value of the second data point. This is illustrated below with respect to FIGS. 5A-5C and 7A-7C. The minima check module retrieves the original data value for each data point and compares it with the calculated distribution value at the same location.

If the minima check module 207 determines that the data value of a data point has been hidden by the distribution of a second data point with a larger data value, a data point inverse calculation module 209 is activated to calculate an inverse distribution for the data point, as described in more detail below with respect to FIGS. 5A-5C and 7A-7C.

The inverse calculation module 209 receives the distribution data from the data point calculation module 205 and/or data retrieval module 203, and uses this data to calculate adjusted distribution values on and around data points that represent minima values. These minima values are those that the minima check module detected have been hidden from view due to larger distribution values associated with nearby data points.

In some embodiments, a drop off smoothing function module 211 may be used to calculate drop off values for the edges of each distribution in order to provide a smoother looking image, as will be described in more detail below with reference to FIG. 4C. The output of the drop off smoothing function module is communicated to the rendering module 213.

A rendering module 213 receives the output of the data point calculation module, inverse data point calculation module and drop off smoothing function module (if used) to render a suitable heatmap image or other data visualization using standard rendering techniques. This rendered data visualization is then provided to an output module 215. That is, the rendering module uses the distribution values calculated by the various modules to create a suitable output signal or file that enables a data visualization (e.g., a heatmap) to be rendered on the desired output module.

The output module may be a display device, such as a standalone display unit, or a display unit integrated with a laptop computing device, PC, hand held computing device, or other computing system or display system.

In some embodiments, further output modules are provided to output the rendered image. That is, the raw data retrieved by the data retrieval module may be analyzed and converted to provide output data in a specific format. The output data may be provided to the display and/or further output modules to enable a user to visualize the raw data in a manner that conveys clear and concise information that is easy to be interpreted and understood.

In some embodiments, a further output module is part of a printing device in communication with the described system to receive print control data so that representations of the data may be printed on any suitable print medium. In some embodiments, the further output module is an interface that enables the data output to/from the rendering module to be interfaced with other data handling modules or storage devices. As a further alternative, the output module may be the same or different data storage module as described above.

Figure 2B:
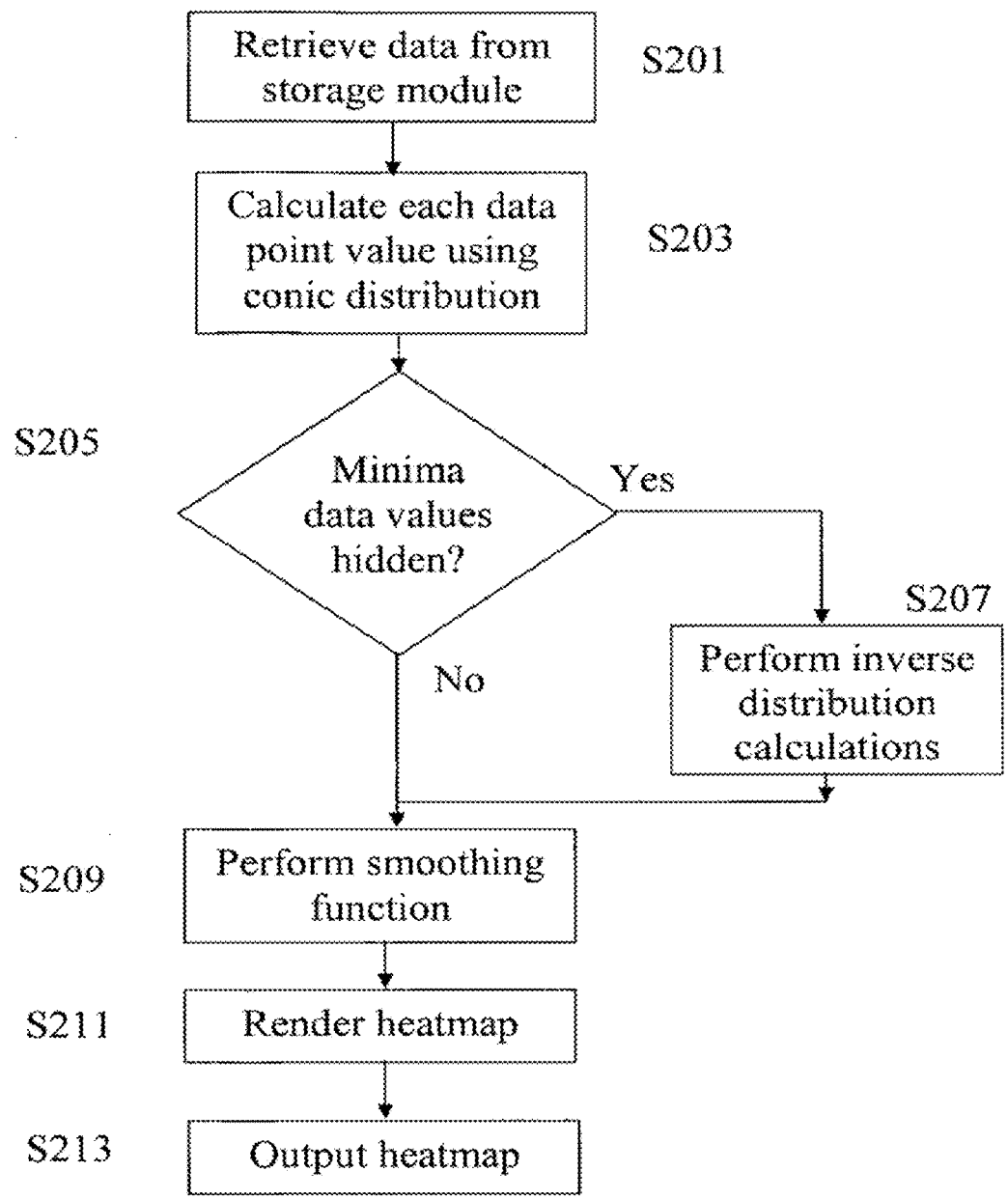
FIG. 2B shows a flow diagram for performing a heatmap generation method according to some embodiments.

FIG. 2B shows a flow diagram for producing a heatmap or other data visualization according to some embodiments. At step S201, the data retrieval module retrieves data from the data storage module. At step S203, conic distribution values are calculated for each data point using the data point calculation module.

At step S205, a minima data check is performed by the minima check module to determine whether any conic distribution values for one data point exceed the actual data values of nearby data points. If so, step S207 is performed for each data point whose data value is less than the distribution value at that location. For these data points, an inverse distribution is calculated by the inverse data point calculation module. This is illustrated in more detail below with respect to FIGS. 5A-5C and 7A-7C.

Step S209 is performed in some embodiments, which computes drop-off values using the drop-off smoothing function module at the edge of data points to provide smoothing. At step S211, the heat map image (or other data visualization) is rendered by the rendering module using the values calculated by the data point calculation module and inverse data point calculation module, and optionally the drop off smoothing function module. At step S213 the rendered image produced by the rendering module is output to the output device.

There are certain key elements that a graphical visualization system designer should bear in mind when determining how and in what form a graphical image is to be visualized. For example, the graphical image should be visually pleasing to the user eye, understandable to the user such that it conveys relevant information about the data being represented and able to be efficiently produced by the system. The method of producing the image using a conic representation as described herein is far more efficient than those previously used to produce heatmaps, such as that shown in FIG. 1 for example.

Figure 3:
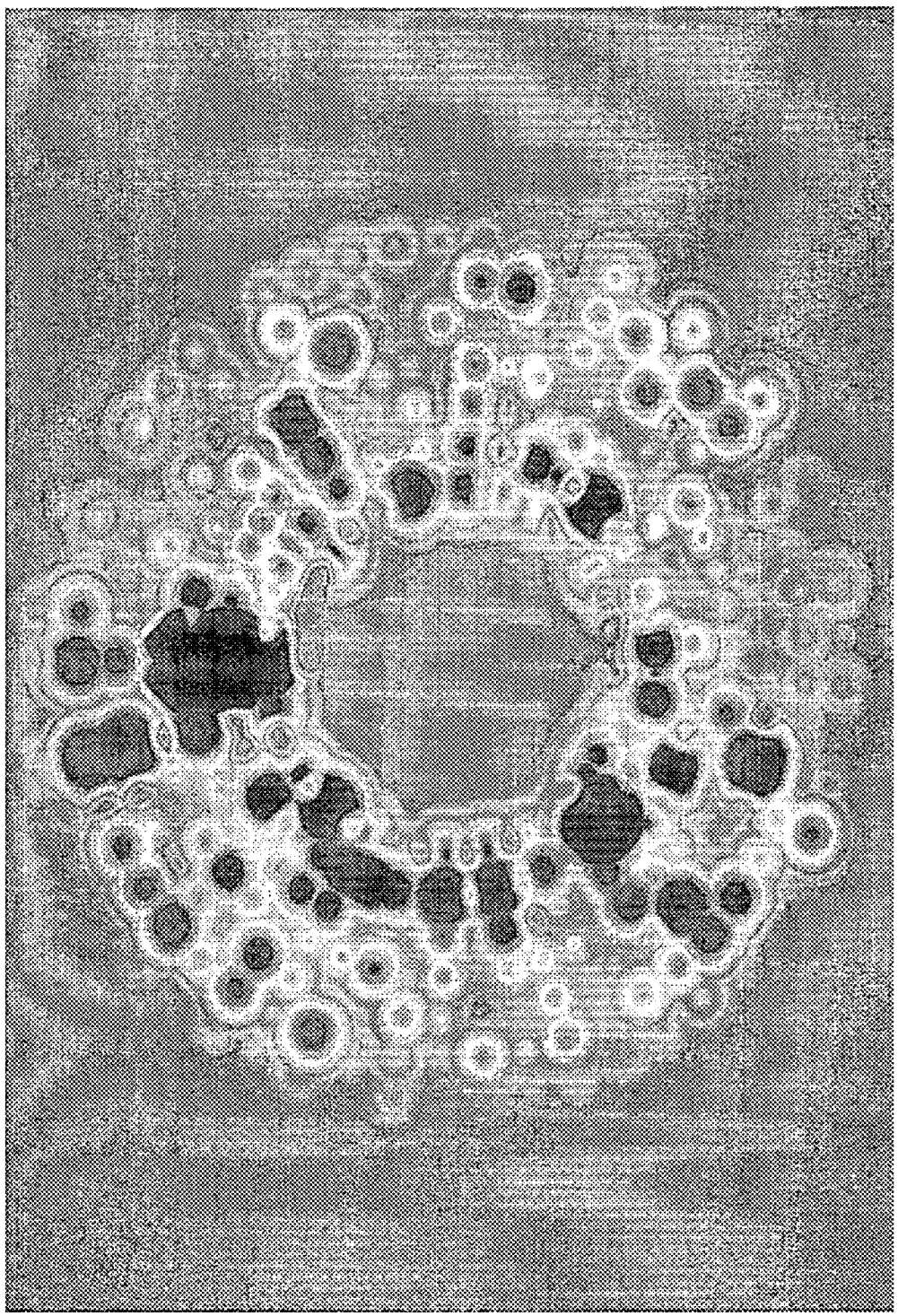
FIG. 3 shows a heatmap generated according to one embodiment.

FIG. 3 shows a heatmap produced by a conic representation method as described herein. The image in FIG. 3 is very pleasing to the eye in nature. This is mainly due to its organic appearance even though the methods used to create the image are non-organic. Organic representations are generally known to be easier to read. Further, the image still conveys the information (which is based on the data points used) in a clear and succinct manner. Further, the methods used to produce the image as herein described are far more efficient than the prior known methods used for producing heatmaps, such as those shown in FIG. 1.

The cone shaped distribution method used in this embodiment for rendering the image is described in more detail below with reference to FIGS. 4A-4C and 5A-5C.

Figure 4A:
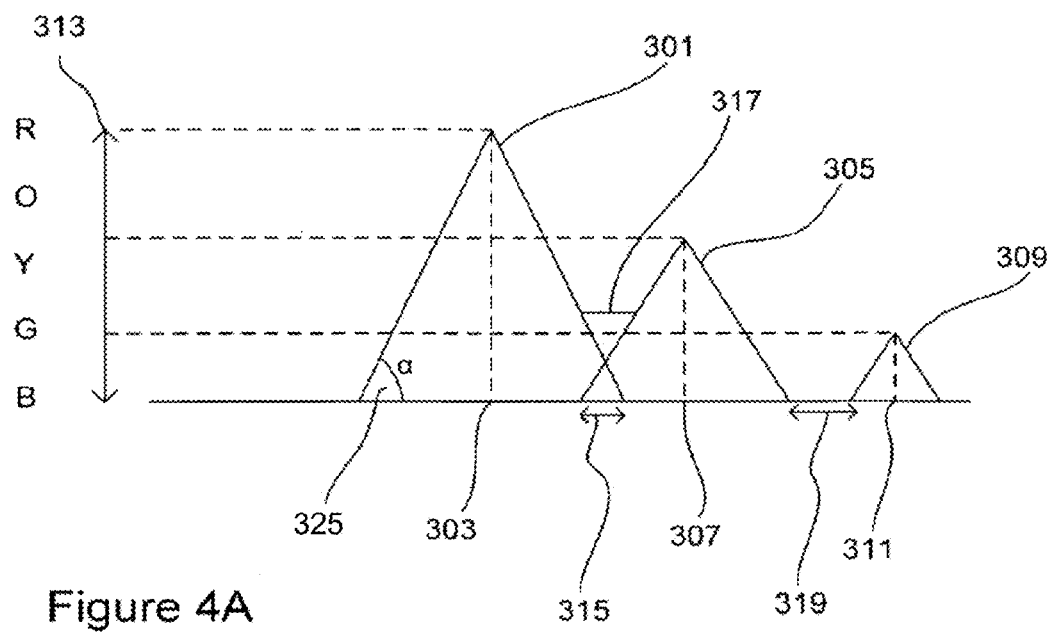
FIGS. 4A-4C illustrate using conic distributions to construct a data visualization according to some embodiments.

FIG. 4A illustrates using a cone-shaped distribution around each data point to construct a data visualization in accordance with some embodiments. This first embodiment uses exact cone shaped distributions for each data point.

Cone distribution 301 is calculated to represent data for data point 303, cone distribution 305 is calculated to represent data for data point 307 and cone distribution 309 is calculated to represent data for data point 311. The cone distribution for each data point is sized according to the data value corresponding to the data point.

In some embodiments, the internal angle 325 between the base and side of each cone distribution is fixed. Therefore, as the data value increases and decreases, the height and base of the cone varies. In some embodiments, the angle is fixed at 45°. Other embodiments use angles between 40° and 50°. It is understood that any suitable angle may be used to form the conical distributions.

In some embodiments, the internal angle 325 is variable so that data points with different data values use different angles. Data points with large data values are represented by higher cones using a larger internal angle and data points with smaller data values are represented by shorter cones using a smaller internal angle. In some of these embodiments, the base of each cone distribution is a fixed size.

It can be seen in FIG. 4A that cone distribution 301 has a higher data value than both of cone distributions 305 and 309. Further, cone distribution 305 has a higher data value than cone distribution 309. That is, cone 301 is representative of a data point with a higher data value than the data points that cones 305 and 309 represent.

Each of the conic distributions effectively provides each data point with a further dimension in which to represent a height variable Z. That is, the further dimension is the height of the data point, where the height corresponds to the data value of the data point.

In some embodiments, distribution values are represented on a heatmap using colors or gray scales. The distribution value calculated by the data point calculation module for each data point is displayed using a range of colors or gray scales and the colors are chosen from the scale based on the calculated distribution value at each location.

In some embodiments, a color scale 313 is provided to graphically indicate the height of the cone for each data point. The scale is the spectrum, from red to blue, including orange, yellow, and green in sequence. For example, the height of cone 301 is indicated in FIG. 4A as being level with the red scale, so the top portion of cone 301 will be rendered in red. The height of cone 305 is indicated as being level with the orange/yellow scale, so the top portion of this cone will be rendered using those colors. The height of cone 309 is indicated as being level with the green scale, so the top portion of this cone will be rendered using a green color. In some embodiments, the appropriate colors used during the rendering stage are determined from a look-up table.

In order to take into account the interaction of two overlapping cones, such as, the cone distributions 301 and 305, distribution values are calculated by the data point calculation module and smoothed (or accumulated) for the overlapping region 315. In some embodiments, the total value of the overlap is taken into account to indicate the cumulative (or additive) effect of the two distributions.

Referring to FIG. 4A, the cumulative sum of the heights of the cones is calculated using the data point calculation module to produce a cumulative value 317 for the combined cones. As noted previously, the height of each cone shown in FIG. 4A represents the data value associated with the data points.

The cumulative effect of the overlap of two distribution regions is represented by a line 317, where the color of the line is determined by calculating the accumulated values of the crossed over distributions 301 and 305. The calculated accumulated value is then used to render the line in the associated color. In this example, the area on the heatmap representing this crossover portion is rendered using a color within the color range that aligns with accumulated value rather than the value that aligns with the exact point of cross over.

In some embodiments, the overlap between the two distribution regions is represented by using the higher of the two distribution values at each location. That is, a cumulative or additive effect is not produced, but instead the outline of the distribution is maintained to indicate the higher of the distribution values of either of the overlapping distributions.

In some embodiments, a drop off function may be applied by the drop off smoothing function module to the edges of the cones to allow the values to drop more smoothly from the cone region into the areas 319 of the map that have no distribution. The steepness of the drop off function may be based on the height of the cone to enable a steeper drop off for shorter cones, and a shallower drop off for taller cones.

Figure 4B:
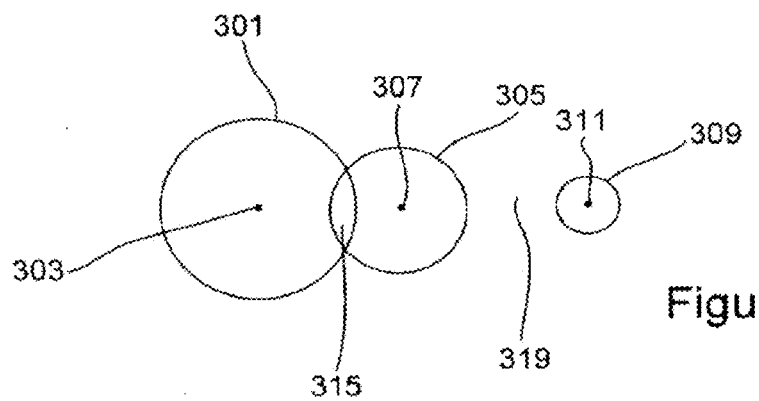
Figure 4C:
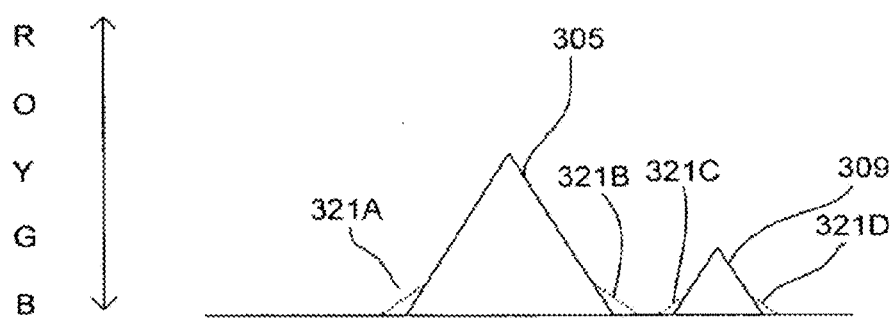

For example, FIG. 4C illustrates a cross sectional view of the conic distributions for a data visualization with drop off smoothing created by portions 321A, 321B, 321C, and 321D. The cone distribution 305 includes drop off smoothing lines 321A and 321B calculated by the drop off smoothing function module. (Of course the "lines" 321A and 321B are both portions of a single "ring" if viewed from the top.) The cone distribution 309 includes drop off smoothing lines 321C and 321D also calculated by the drop off smoothing function module. Therefore, the colors used to represent the edges of the cones where they meet the minimal value (or background value) associated with the heatmap drop off more smoothly or in a shallower manner to provide a more aesthetic graphical image. The drop off smoothing function may be any suitable smoothing calculation. For example, a Gaussian blur function as described at http://en.wikipedia.org/wiki/Gaussian_blur may be used.

FIG. 4B shows a plan view corresponding to the cross section shown in FIG. 4A. The base of cone 301 is displayed next to the base of cone 305, with an overlap portion 315. The color of the base of cone 301 is blue, which then blends into the color of cone 305, which is green/yellow. Where the cone distributions 301 and 305 overlap, some embodiments use the cumulative effect, but other embodiments use the higher distribution at each location.

To take into account data points with small data values that are close to data points with larger data values, some embodiments use the following method. In accordance with this method, data points with smaller data values are not swamped by the data points with larger values, and thus the smaller data values are visible in the graphical representation.

Figure 5A:
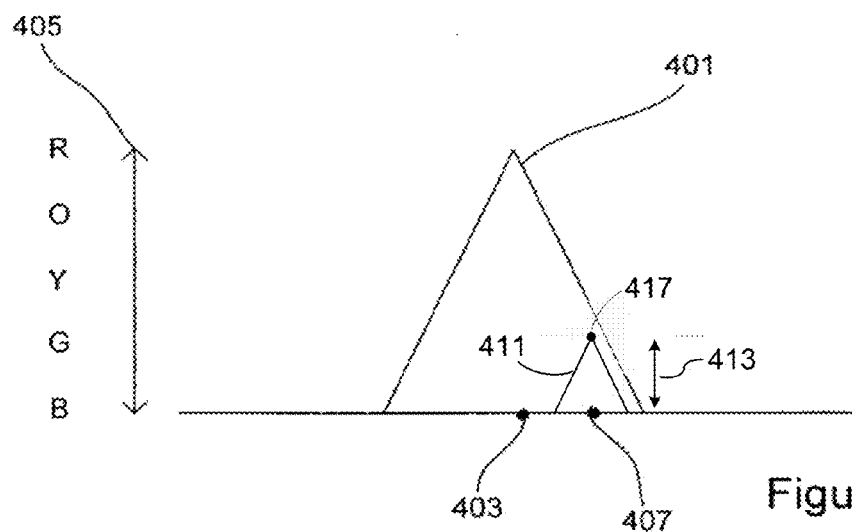
FIGS. 5A-5C illustrate how conic distributions can be adjusted when a large data value is near a small data value in accordance with some embodiments.
Figure 5B:
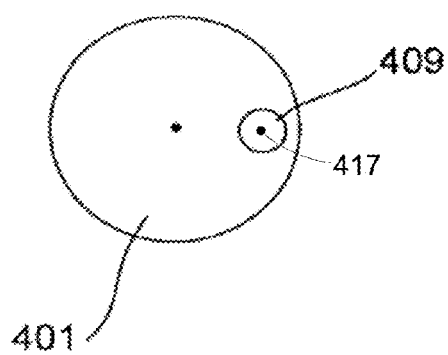
Figure 5C:
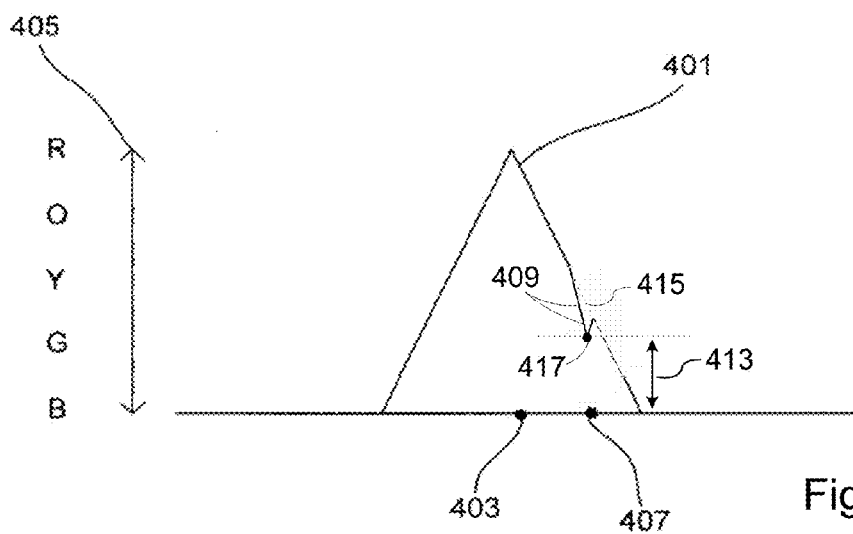

The minima check module determines whether the data values are correctly represented. In particular, the minima check module determines whether a calculated distribution value for one data point at a location is greater than the data value of a second data point at the same location. If the minima check module determines that the data values for one or more data points are less than the calculated distribution values at the locations of those data points, an inverse distribution is calculated around each of those data points as described below in FIGS. 5A-5C and 7A-7C. In FIGS. 5A-5C, an inverse distribution uses an exact conic distribution that is inverted. That is, the cone shape is turned upside when viewing the cone as a cross section so that the apex of the cone is pointing towards the data point being represented. In some embodiments, the inverted cones have smaller circumferences than corresponding upright cones.

FIG. 5A illustrates using conic distributions to construct a data visualization in accordance with some embodiments. A first cone 401 indicating a larger data value for a data point 403 is shown and represented using a color in the spectrum range 405, as discussed above. A further data point 407 with a smaller data value 413 is also present, which is to be represented on a heatmap as the peak 417 of the smaller cone 411. However, this peak 417 is swamped by the calculated conical distribution of cone 401. If no corrective action were taken, the data point 407 and its data value 413 would not be visible.

Therefore, the data for the second data point 407 is represented by applying an inverse cone shaped distribution around the data point, as illustrated in FIG. 5C. An inverse cone 409 is applied by utilizing the same methodology as the cone shaped distribution, but in reverse (or upside down), so that the tip of the cone 409 is at the data value height 413. That is, the peak 417 of the inverted cone 409 is at the same location as the peak 417 of the upright cone 411. In this case, the data point 407 is sometimes referred to as a minimum or minima. The colors assigned to the inverted cone 409 use the same color spectrum scale 405.

By applying an inverse cone as described, the data value of the data point 407 is "drilled" through the surface of the larger cone 401 so that the data value can be represented or viewed through the larger cone. That is, a hole 415 is effectively created through the surface of the larger cone so the smaller data value can be visualized.

The overlap of the two cones may provide a cumulative effect on the spectrum value in that area by subtracting the data value for the minima as represented by data point 407 from the data value for the maxima as represented by data point 403.

Alternatively, the overlap of the cone distributions may be calculated by taking the minimum of the two data distribution values where they overlap.

FIG. 5B shows a plan view of the cross section shown in FIG. 5C. As FIG. 5B shows, the peak 417 of the inverted cone 409 is visible, thus showing the data value 413 of the data point 407.

The colors between the two bases of the cones may be blended to provide a less garish and more pleasing image, as shown in FIG. 3. For example, referring to FIG. 5B, a smoothing function may be applied around the edge of the smaller inverted cone 409 to provide a smoothing effect at the boundary with the larger cone. Although the inverted cone 409 is illustrated as a circle in FIG. 5B, the actual shape is more elongated and complex because the inverted cone 409 only goes up to the height of the larger cone 401 as illustrated in FIG. 5C.

The embodiments described herein provide significant advantages over the prior art. For example, the computational efficiency of calculating the distribution values is increased as no interpolation steps are required. Further, spread functions that require a large amount of processing power are not required. Also, the metrics represented are true representations of the data values of the source data points.

Further, the data from one source data point has no effect on distant data points, unlike traditional distribution curves where each point is affected by distant points. This means that the calculations performed using the methods described herein do not require threshold or limiting values (which can create distortions in the representation of the true values).

Further, a heatmap represented using substantially conic distributions is less organic in nature than typical heatmaps, so it becomes possible for a user to see and determine values from the heatmap more accurately. This is because cone geometries are more deterministic in nature compared with the distributions used to form prior known heatmaps. Also the use of the various geometries described herein enables the source points to be made visibly clearer.

As illustrated, conic distributions are constructed that represent data points and their corresponding data values. This forms an accurate representation that can be subject to measurement for precise data representation. For example, in a gaming environment, where the heatmap methods described herein are used to represent data associated with a gaming floor, a user may be able to determine the data value of a source data point to within 1-3% of its actual value rather than 2-5% for a traditional heatmap.

The methods described herein do not create a surface to form a heatmap, as used in prior known methods. Instead, each individual conic distribution graphically shows the data value of a single data point.

Some embodiments modify the conic distributions to use other suitable conic type distributions. In some embodiments, a frustoconical or "tent" shaped distribution is applied by the data point calculation module and inverse data point calculation module. Such a distribution is essentially just a cone with a peak portion removed, as illustrated below in FIGS. 6A, 7A, and 7C.

Figure 6A:
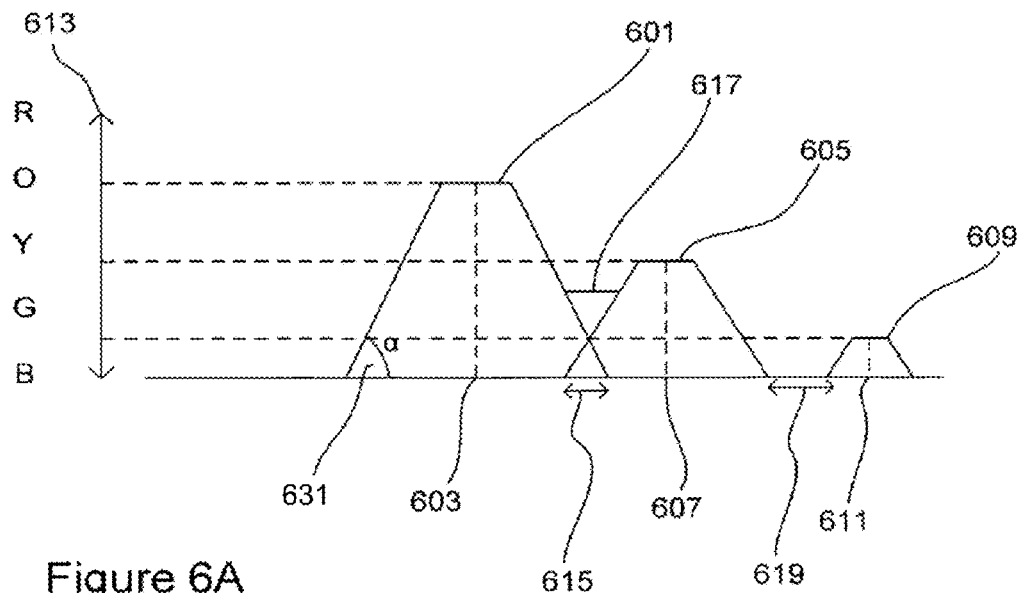
FIGS. 6A-6B illustrate using frustoconical distributions to construct a data visualization according to some embodiments.
Figure 6B:
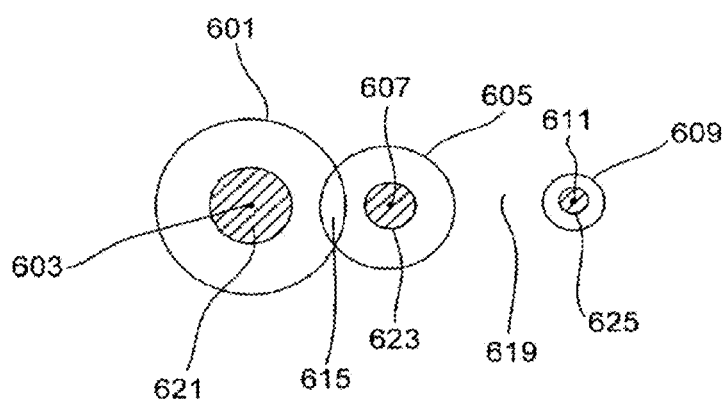

FIGS. 6A and 6B illustrate using frustoconical distributions to construct a data visualization in accordance with some embodiments. In these embodiments, a color scale 613 is provided as in the first embodiment. The heights of the frustoconical distributions 601, 605 and 609 determine what colors are used at each location to render the data visualization. Distribution values are calculated by the data point calculation module in the same manner as described in the first embodiment but using a different distribution around the data point. As illustrated, the distribution 601 surrounds data point 603, the distribution 605 surrounds data point 607, and distribution 609 surrounds data point 611. The angles 631 of the frustoconical distributions may be fixed or variable, as described above with respect to FIG. 5A.

FIG. 6A illustrates that in some embodiments the cumulative sum of the heights of the distributions is calculated using the data point calculation module to produce a cumulative value 617 for the combined distributions. The colors in the overlap portion 615 are determined by calculating the accumulated distribution values of the crossed over distributions 601 and 605. The calculated accumulated value is then used to render the each point in the overlap with the appropriate color. Some embodiments take the maximum of the two distributions at each location in the overlap rather than applying an additive algorithm.

In some embodiments, a drop off function may be applied by the drop off smoothing function module to the edges of the distributions to allow the values to drop more smoothly around the base of each frustoconical region. For example, a smoothing function may be used in the region 619 between the frustoconical distributions 605 and 609.

FIG. 6B shows a plan view of the cross section shown in FIG. 6A. The base of frustoconical distribution 601 is displayed next to the base of frustoconical distribution 605, with an overlap portion 615. Further, the top of the frustoconical distribution 601 is visible as an area 621, for distribution 605 as an area 623 and for distribution 609 as an area 625.

To take into account data points with small data values (e.g., minima) that are close to data points with large data values (e.g., maxima), the same method as described with respect to FIGS. 5A-5C may be used. The minima check module determines whether the data values are correctly represented (e.g., that the frustoconical distribution from one data point is not greater that the data value associated with a nearby data point). If the minima check module determines that the values are not correctly represented, an inverse distribution is calculated, as illustrated with respect to FIGS. 5A-5C above.

Figure 7A:
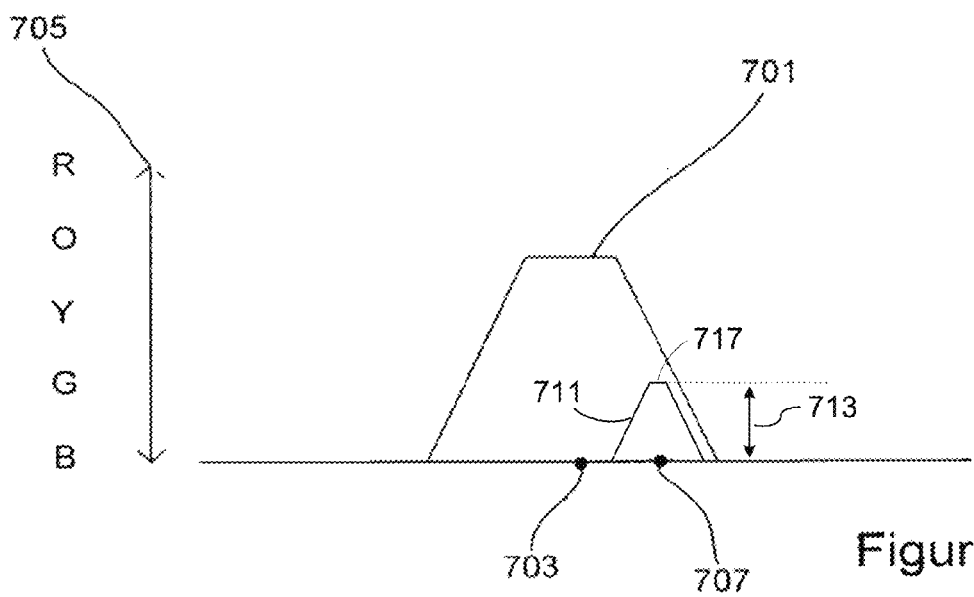
FIGS. 7A-7C illustrate how frustoconical distributions can be adjusted when a large data value is near a small data value according to some embodiments
Figure 7B:
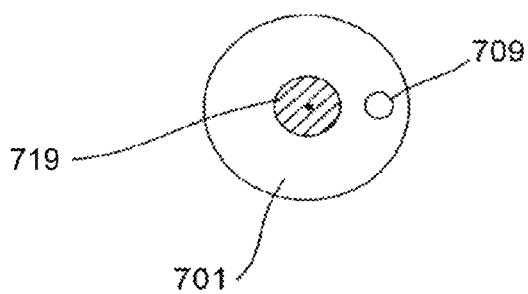
Figure 7C:
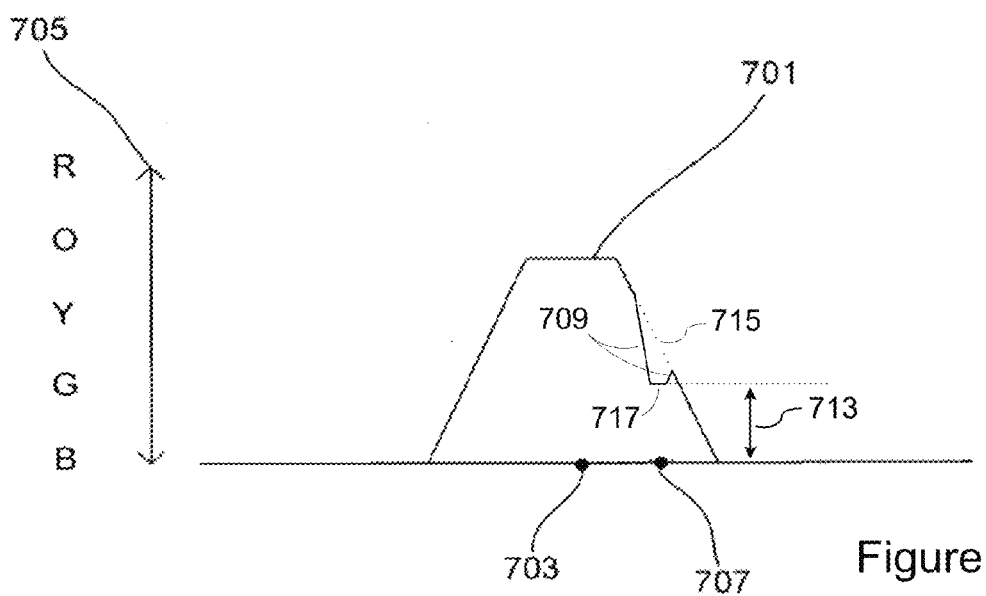

FIGS. 7A-7C illustrate constructing a data visualization using frustoconical distributions when one data point with a large data value is near another data point with a small data value. A first frustoconical distribution 701 indicating a larger data value for a data point 703 is shown and represented using a color in the spectrum range 705. A second data point 707 with a smaller data value 713 is also present, which is to be represented in the heatmap (or other data visualization) using a frustoconical distribution 711. As illustrated in FIG. 7A, the peak 717 of the frustoconical distribution 711 is below the frustoconical distribution 701 of the first data point 703. If the data were presented in this way, the data point 707 would be hidden.

To resolve this problem, the second data point 707 is represented by applying an inverse frustoconical shaped distribution 709 around the data point 707 as illustrated in FIG. 7C. The inverse distribution 709 is applied in the same manner as the inverse conical distribution 409 illustrated and described with respect to FIG. 5C. Therefore, the "top" surface 717 of the inverse frustoconical distribution is positioned at the data value height 713.

By applying an inverse distribution 709 as described, the data value of the data point 707 is drilled through the larger distribution 701 so that it can be viewed in a similar manner as described above in FIGS. 5A-5C. The data value 713 is visible as the peak 717, which is seen through the hole 715 that has been created through the larger distribution 701.

The overlap of the two distributions may provide a cumulative effect on the spectrum value in that area by subtracting the data value for the minima as represented by data point 707 from the data value for the maxima as represented by data point 703. Alternatively, the overlap may be calculated by taking the minimum of the two distributions rather than applying a cumulative algorithm.

FIG. 7B shows a plan view of the cross section shown in FIG. 7C. An area 719 represents the top flat surface of the frustoconical distribution 701, whereas the base of the distribution 709 is represented. This therefore provides a clear indication in the graphic that there is a minima value present in the area. As noted above, a smoothing function may be applied around the edges of the distributions.

Figure 8A:
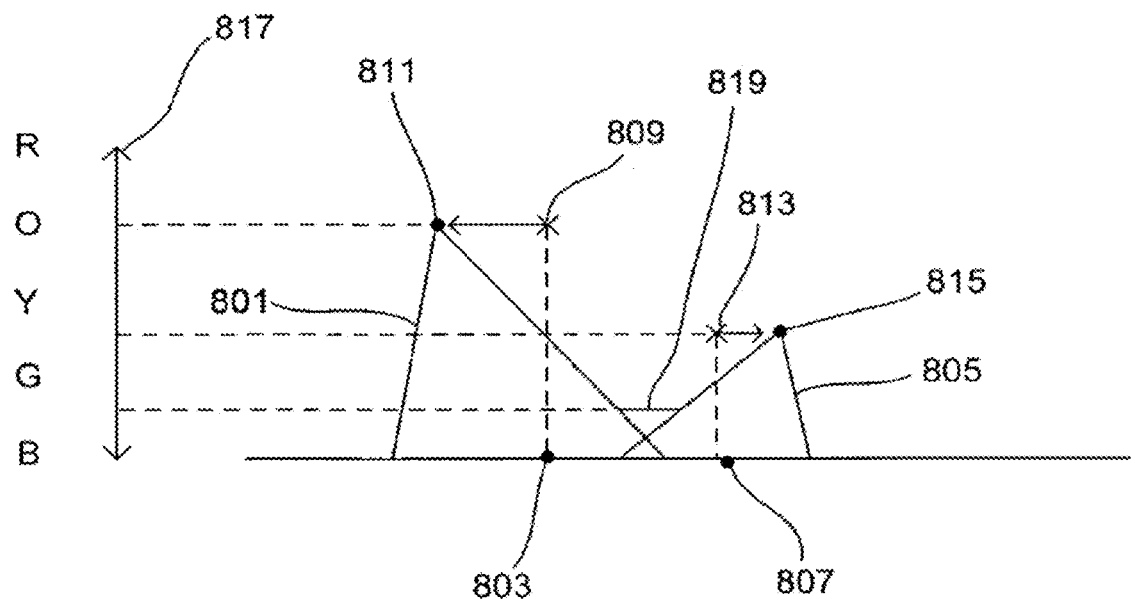
FIGS. 8A-8B illustrate using skewed conical distributions to construct a data visualization according to some embodiments.

In some embodiments, distribution values are based on skewed cones, as illustrated in FIG. 8A. In FIG. 8A, skewed cone distribution 801 is used for data point 803, and skewed cone distribution 805 is used for data point 807. For a standard (also known as "exact") cone distribution, the tip or apex of the cone 801 would be in the position indicated by point 809. However, according to this embodiment, the apex is moved horizontally from point 809 in the direction of the arrow to point 811 to form a skewed conic distribution. Similarly, for an exact cone distribution, the tip or apex of the cone 805 would be in the position indicated by point 813. However, according to this embodiment, the apex is moved parallel to the base from point 813 in the direction of the arrow to point 815 to form a skewed conic distribution.

In this embodiment, the rendering of the distribution utilizes the same color mapping techniques as described above by using a color scale 817. Other forms of rendering are envisaged as described in the previous embodiments.

By using a skewed conic distribution as described, the overlap of the cones forms a line 819. The color value for this line is lower than that of the standard cone distribution. Thus, the visual appearance of the actual values of the source points (803 and 807) is enhanced. That is, the overlap values of the skewed cones have a reduced effect on the visual representation thus producing an increased visual effect of the actual source points. Further, individual points are distinguished whilst maintaining the overall effect of all data points in the representation.

As in the above described embodiments, the overlap may be calculated by taking the maximum of the two distributions rather than applying an additive algorithm.

Figure 8B:
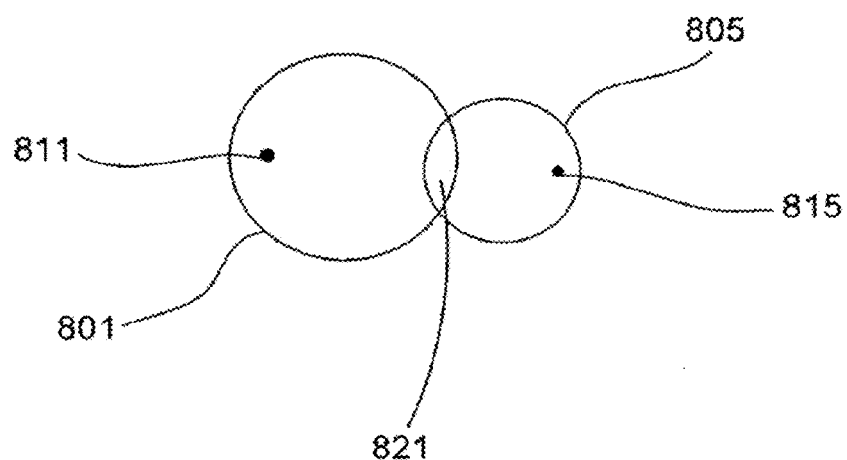

FIG. 8B shows a plan view of the representation where the overlap area 821 appears as the same size as would appear if a standard conic distribution were used. However, the color value attributed to that area has a lower heat value so that the source point values are enhanced.

The inverse conic methods described above in the previous embodiments may also be applied to this embodiment where they are adapted to apply an inverse skewed cone distribution for viewing minima data values.

The data visualization techniques described herein transform the raw data received into a visual representation of the data to enable further or hidden information within the raw data to be visually represented in a manner that conveys the information to a user in an efficient manner. For example, both fine detail and course detail associated with the data is easily interpretable from the heatmap or other data visualization produced using the disclosed methods. The embodiments described herein are by way of example only, and various changes and modifications may be made without departing from the scope of invention.

Figure 9:
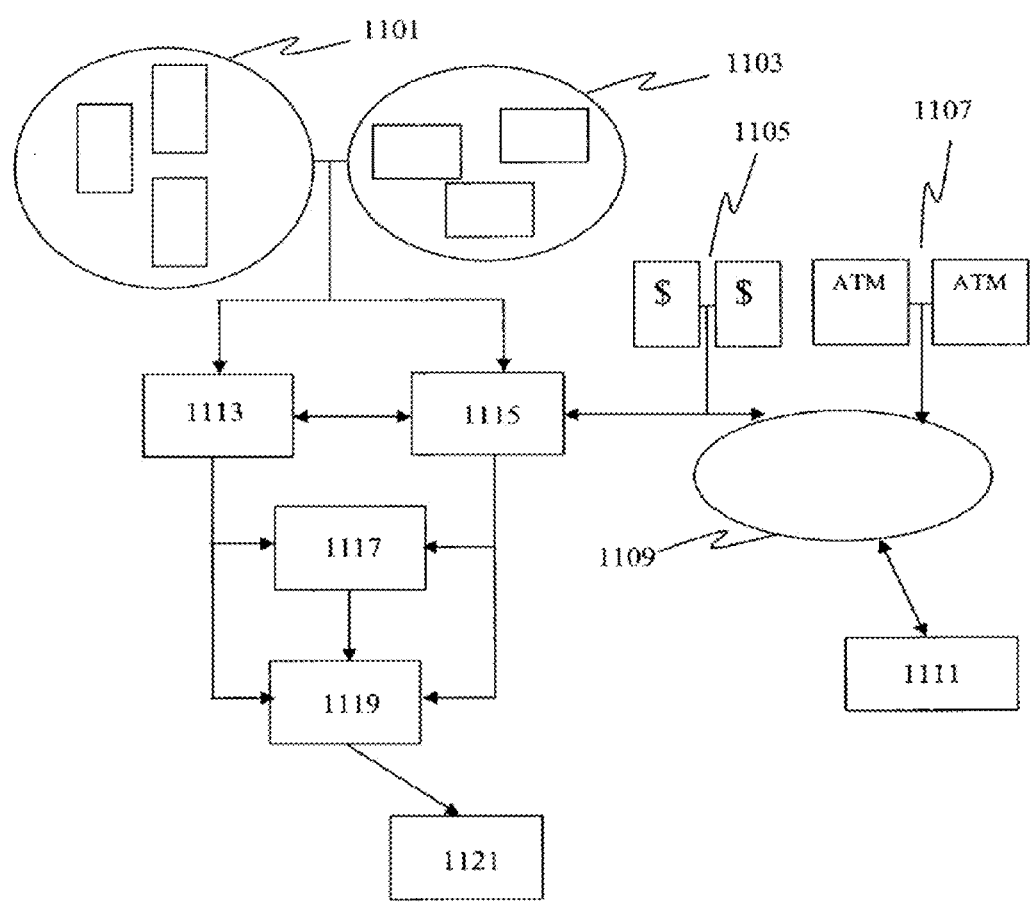
FIG. 9 shows a system diagram of a gaming environment according to some embodiments.

FIG. 9 shows an example context where the above described embodiments may be incorporated within a gaming environment. The gaming environment consists of a number of gaming machines 1101 and electronic tables 1103 (among other electronic gaming devices) that are adapted to communicate electronically with other systems using any suitable protocols, such as data packet protocols.

The gaming environment further includes a number of electronic cashier devices 1105 and ATMs 1107 which are in communication via a Wide Area Network 1109 with one or more financial databases 1111.

Data from the gaming machines 1101 and electronic tables 1103 are transferred to a reward program database 1113 and customer database 1115. It will be understood that these two databases may be combined into a single database.

Data from the cashier devices are also transferred to the reward program database 1113 and customer database 1115. The databases 1113 and 1115 are in communication with a central hotel management system 1117 that oversees the operation of the gaming environment, including the activities of customers in other areas of a casino, such as shops, hotels, spas etc.

The system 1119 as described in the above embodiments is in communication with the reward program database 1113, customer database 1115 and central hotel management system 1117 so the system can retrieve all necessary data about the activities within the gaming environment and produce heatmaps according to the various methods based on the data. The various embodiments as described herein are employed by the system 1119 to provide an output 1121.

The systems, methods, and techniques described above may be implemented using any suitable tool. For example, software programs can perform the described methods. Alternatively, the method may be implemented using a programmed chip set arranged to perform the method steps. For example, the chip set may form part of a printing device specifically arranged to carry out the method of producing the herein described heatmaps. The chip set may be a hardwired chip set, programmable chip set, or software controlled chip set. Further, a hard wired or programmable computer system may be used to carry out the method steps.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for creating a graphical representation of data, comprising:
   at an electronic device having one or more processors and memory:
   identifying a finite set of data points in a data set;
   for each of the identified data points:
      calculating a respective conical distribution centered on the respective data point and based on a respective data value, wherein the respective conical distribution specifies a respective distribution value corresponding to each location in a respective region centered on the respective data point;
      determining that a first data value of a first data point is less than a distribution value for a second data point, wherein the distribution value has a location that corresponds to the first data point;
      based on the determination, calculating an inverse conical distribution in a region around the first data point; and
   combining the conical distributions and inverse conical distributions to display a heatmap data visualization that includes each of the data points and displays a respective color for each location based on combining the distribution values for the respective location.

2. The method of claim 1, wherein the conical distribution is a frustoconical distribution, an exact conical distribution, or a skewed conical distribution.

3. The method of claim 1, wherein the inverse conical distribution is an inverse frustoconical distribution, an exact inverse conical distribution, or a skewed inverse conical distribution.

4. The method of claim 1, further comprising summing distribution values at locations where conical distributions for multiple data points overlap.

5. The method of claim 1, further comprising selecting a highest distribution value of multiple data points at locations where conical distributions for the multiple data points overlap.

6. The method of claim 1, wherein the data is gaming data associated with a gaming environment or retail data associated with a retail environment.

7. A graphical computing system, comprising:
   one or more processors;
   memory; and
   one or more programs stored in the memory for execution by the one or more processors, the one or more programs including instructions for:
   identifying a finite set of data points in a data set;
   for each of the identified data points:
      calculating a respective conical distribution centered on the respective data point and based on a respective data value, wherein the respective conical distribution specifies a respective distribution value corresponding to each location in a respective region centered on the respective data point;
      determining that a first data value of a first data point is less than a distribution value for a second data point, wherein the distribution value has a location that corresponds to the first data point;
      based on the determination, calculating an inverse conical distribution in a region around the first data point; and
   combining the conical distributions and inverse conical distributions to display a heatmap data visualization that includes each of the data points and displays a respective color for each location based on combining the distribution values for the respective location.

8. The system of claim 7, wherein the conical distribution is a frustoconical distribution, an exact conical distribution, or a skewed conical distribution.

9. The system of claim 7, wherein the inverse conical distribution is an inverse frustoconical distribution, an exact inverse conical distribution, or a skewed inverse conical distribution.

10. The system of claim 7, the one or more programs further comprising instructions for summing distribution values at locations where conical distributions for multiple data points overlap.

11. The system of claim 7, the one or more programs further comprising instructions for selecting a highest distribution value of multiple data points at locations where conical distributions for the multiple data points overlap.

12. The system of claim 7, wherein the data is gaming data associated with a gaming environment or retail data associated with a retail environment.

13. A non-transitory computer readable storage medium storing one or more programs configured for execution by an electronic computing device, the one or more programs comprising instructions for:
   identifying a finite set of data points in a data set;
   for each of the identified data points:
      calculating a respective conical distribution centered on the respective data point and based on a respective data value, wherein the respective conical distribution specifies a respective distribution value corresponding to each location in a respective region centered on the respective data point;
   determining that a first data value of a first data point is less than a distribution value for a second data point, wherein the distribution value has a location that corresponds to the first data point;
   based on the determination, calculating an inverse conical distribution in a region around the first data point; and
   combining the conical distributions and inverse conical distributions to display a heatmap data visualization that includes each of the data points and displays a respective color for each location based on combining the distribution values for the respective location.

14. The computer readable storage medium of claim 13, wherein the conical distribution is a frustoconical distribution, an exact conical distribution, or a skewed conical distribution.

15. The computer readable storage medium of claim 13, wherein the inverse conical distribution is an inverse frustoconical distribution, an exact inverse conical distribution, or a skewed inverse conical distribution.

16. The computer readable storage medium of claim 13, the one or more programs further comprising instructions for summing distribution values at locations where conical distributions for multiple data points overlap.

17. The computer readable storage medium of claim 13, the one or more programs further comprising instructions for selecting a highest distribution value of multiple data points at locations where conical distributions for the multiple data points overlap.

* * * * *